(12) United States Patent
Katok (10) Patent No.: US 8,950,234 B2
(45) Date of Patent: Feb. 10, 2015

(54) APPARATUS FOR REPAIRING CONTROL ARMS OF AUTOMOTIVE SUSPENSION

(76) Inventor: Vitaliy V. Katok, Minsk (BY)

( * ) Notice: Subject to any disclaimer, the term of this patent is extended or adjusted under 35 U.S.C. 154(b) by 225 days.

(21) Appl. No.: 13/592,156

(22) Filed: Aug. 22, 2012

(65) Prior Publication Data

US 2014/0041182 A1 Feb. 13, 2014

Related U.S. Application Data

(60) Provisional application No. 61/682,109, filed on Aug. 10, 2012.

(51) Int. Cl.
*B21D 1/12* (2006.01)
*B21J 13/00* (2006.01)

(52) U.S. Cl.
USPC .................................. 72/458; 72/704; 72/386

(58) Field of Classification Search
USPC ........................... 72/386, 457, 458; 29/402.07
See application file for complete search history.

(56) References Cited

U.S. PATENT DOCUMENTS

| | | | | |
|---|---|---|---|---|
| 2,781,680 | A * | 2/1957 | Johnson et al. | 72/704 |
| 3,389,927 | A | 6/1968 | Herbenar | |
| 3,481,176 | A * | 12/1969 | Horn | 72/386 |
| 4,117,709 | A * | 10/1978 | Jackson | 72/386 |
| 4,283,833 | A | 8/1981 | Pyles | |
| 4,388,820 | A * | 6/1983 | Rickbeil | 72/458 |
| 4,424,697 | A * | 1/1984 | Carver | 72/704 |
| 4,462,241 | A * | 7/1984 | Whisenant | 72/458 |
| 4,898,018 | A * | 2/1990 | Ventress | 72/457 |
| 6,076,247 | A | 6/2000 | Durand | |
| 8,267,414 | B2 | 9/2012 | Mesa et al. | |
| 8,516,673 | B1 * | 8/2013 | Katok | 29/402.07 |

FOREIGN PATENT DOCUMENTS

| | | |
|---|---|---|
| EP | 2206932 A1 | 7/2010 |
| JP | H09236114 A | 9/1997 |

OTHER PUBLICATIONS

European search report from counterpart European Application No. 12182197.9.

* cited by examiner

*Primary Examiner* — David B Jones
(74) *Attorney, Agent, or Firm* — Arent Fox LLP; Michael Fainberg (57) ABSTRACT

Disclosed are a bending roller apparatus and methods for use thereof for repairing a control arm of automotive suspension. An example apparatus includes a base having a saddle supporting a matrix to which the control arm is removably affixed. The matrix provides longitudinal and lateral movements and rotation of the control arm in a horizontal plane. The apparatus includes a matrix position calibration means for calibrating longitudinal, lateral and rotary positions of the matrix. The apparatus includes a bending roller positioning means for calibrating vertical and longitudinal positions of a bending roller to bring the bending roller in a contact with the upward-extending flange. The apparatus further includes bending roller means for bending the upward-extending flange inwards by rolling the bending roller along the circumference of the flange while applying a downward force on the flange thereby bending it inwards and sealing off the ball stud in the receptacle.

7 Claims, 11 Drawing Sheets

APPARATUS FOR REPAIRING CONTROL ARMS OF AUTOMOTIVE SUSPENSION

CROSS-REFERENCE TO RELATED APPLICATIONS

This application claims benefit of priority of U.S. Provisional Patent Application No. 61/682,109 filed on Aug. 10, 2012, which is incorporated by reference herein.

TECHNICAL FIELD

The present invention relates to the automotive field, and more particularly to an apparatus and methods for repairing control arm of an automotive suspension.

BACKGROUND

Suspension is an integral part of an automobile. Generally, suspension includes a system of springs, shock absorbers and control arms that connect a vehicle to its wheels and allows relative motion between the two. Suspension serve a dual purpose contributing to the vehicle's roadholding/handling and braking for good active safety and driving pleasure, and keeping vehicle occupants comfortable and reasonably well suppress from road noise, bumps, and vibrations, etc. Control arms of the suspension are used to guide and steer the wheels. The control arm provides on one side the connection with the bearing arrangement of the wheel and on the other side the connection with the vehicle body. During operation of the vehicle, the control arms are constantly subjected to various degrees of stress and its components can wear out resulting in various problems, which range from noise coming from the suspension to more serious damage to the wheels and other automotive systems. Replacement of worn control arms with new ones can be expensive. Therefore, there is a need for inexpensive mechanism for repairing used control arms to extend their service life.

SUMMARY

Disclosed are apparatus and methods for repairing aluminum control arms of an automotive suspension. In one example embodiment, a method for repairing an aluminum control arm of the automotive suspension having a worn out or damaged ball stud includes: removing holding means that seal off the ball stud in a receptacle of the control arm, extracting the ball stud from the receptacle, cleaning a surface of the receptacle where the holding means were located, welding a circular, upward-extending flange to the cleaned surface of the receptacle, inserting a new ball stud in the receptacle of the control arm, and bending (or swaging) the upward-extending flange inwards to seal off the new ball stud in the receptacle.

In another example embodiment, a bending roller apparatus includes a base having a saddle supporting a matrix to which the control arm can be removably affixed. The matrix provides longitudinal and lateral movements and rotation of the control arm in a horizontal plane. The apparatus further includes a matrix position calibration means for calibrating longitudinal, lateral and rotary positions of the matrix. The apparatus also includes bending roller positioning means for calibrating vertical and longitudinal positions of a bending roller to bring the bending roller in a contact with the upward-extending flange. The apparatus further includes bending roller means for bending (or swaging) the upward-extending flange inwards by rolling the bending roller along the circumference of the flange while applying a downward force on the flange thereby bending it inwards and sealing off the ball stud in the receptacle.

In another example embodiment, a method for repairing aluminum control arms of an automotive suspension using the bending roller apparatus includes affixing a control arm to a matrix of the bending roller apparatus. The method further includes calibrating longitudinal, lateral and rotary positions of the matrix of the bending roller apparatus in the horizontal plane relative to the base of the of the bending roller apparatus. The method further includes calibrating vertical and longitudinal positions of a bending roller of the bending roller apparatus to bring the bending roller in contact with the flange of the control arm. The method further includes bending the upward-extending flange inwards by rolling the bending roller along the circumference of the flange while applying a downward force on the flange thereby bending the flange inwards and sealing off the ball end of the ball stud in the receptacle.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of an apparatus and methods for repairing control arms of an automotive suspension. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators ill be used to the extent possible throughout the drawings and the following description to refer to the same or like items.

Figure 1:
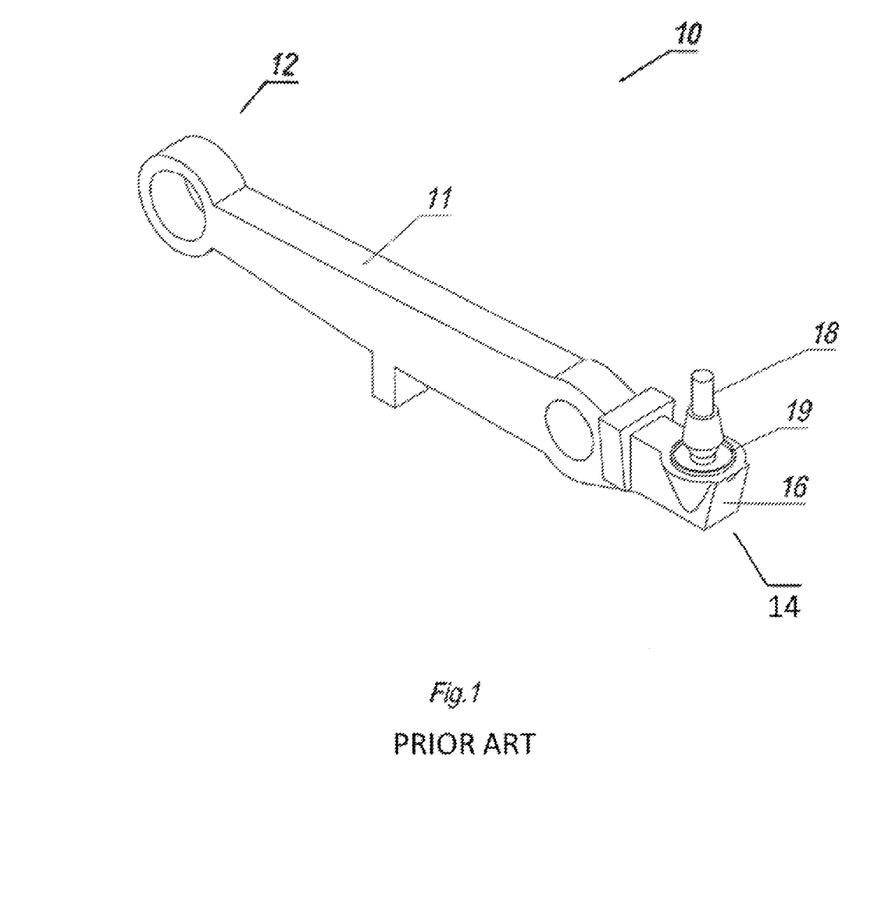
FIG. 1 illustrates an example of a used control arm of an automotive suspension.

FIG. 1 illustrates an example control arm of an automotive suspension. As depicted, control arm 10 includes an elongated body 11 having an inner end 12 and an outer end 14. The body 11 of the control arm 10 is preferably manufacture of aluminum or one of its alloys, which are generally lightweight, durable and corrosion-resistant metals. The inner end 12 faces the body of the vehicle (not shown), and the outer end 14 faces a wheel assembly (not shown). The outer end 14 includes a receptacle 16, such as a socket, for receiving a steel bearing stud 18, such as a ball stud. One end of the bearing stud 18 includes ball (not shown) mounted within the receptacle 16 to form a ball joint. A metal or plastic washer (not shown) and/or grease lubricant can be placed inside the receptacle 16 between the ball of the bearing stud 18 and the inner surface of the receptacle 16 to facilitate smooth movement/rotation of the ball within the receptacle 16. The bearing stud 18 may be held in place in the receptacle 16 using a circular flange 19 running along the edge of the receptacle 16 and extending inwards, so that bearing stud 18 can swivel within the receptacle 16, but cannot be removed therefrom. The other end of the bearing stud 18 is typically tapered and threaded (not shown) to fit into a tapered hole in the steering knuckle (not shown) of the wheel assembly (not shown).

Ball joint of the control arm 10 is the pivot between the wheels and the suspension of the vehicle. Ball joints play a critical role in the safe operation of the vehicle's steering and suspension. However, due to the constant stress on the ball joint, the steel bearing stud 18, the washer and/or grease lubricant within the receptacle 16 frequently wear out. Signs of a failing ball joint usually start with a clicking or snapping sound when the wheel is turned and eventually turn into a squeaking sound at the end of a stop, when the gas pedal is used and/or also when hitting bumps. When this happens, a typical solution is to replace the entire control arm 10 with a new cane. However, new control arms are expensive. Therefore, there is a need for an ecologically clean mechanism for repairing used control arms to extend their service life.

In one example embodiment, a method for repairing a used aluminum control arm of the automotive suspension involves removing the old aluminum flange 19 and a cover (not shown) holding the bearing stud 18 in the receptacle 16 and extracting the bearing stud 18 from the receptacle 16. The removal of the old flange 19 and extraction of the bearing stud 18 can be performed using any known mechanical processes. For example, the flange 19 can be cut off using known cutting tools. Alternatively, the bearing stud 18 can be physically pulled out by force out of the receptacle 16, thereby breaking the old flange 19 holding it place within the receptacle 16. Once the old bearing stud 18 is removed, the outer surface of the receptacle 16, where the old flange 19 used to be, can be cleaned, conditioned or skived using known chemical or mechanical processes to remove any aluminum left from the old flange 19 and to prepare control arm 10 for further processing, as will be described in greater detail below.

Figure 2:
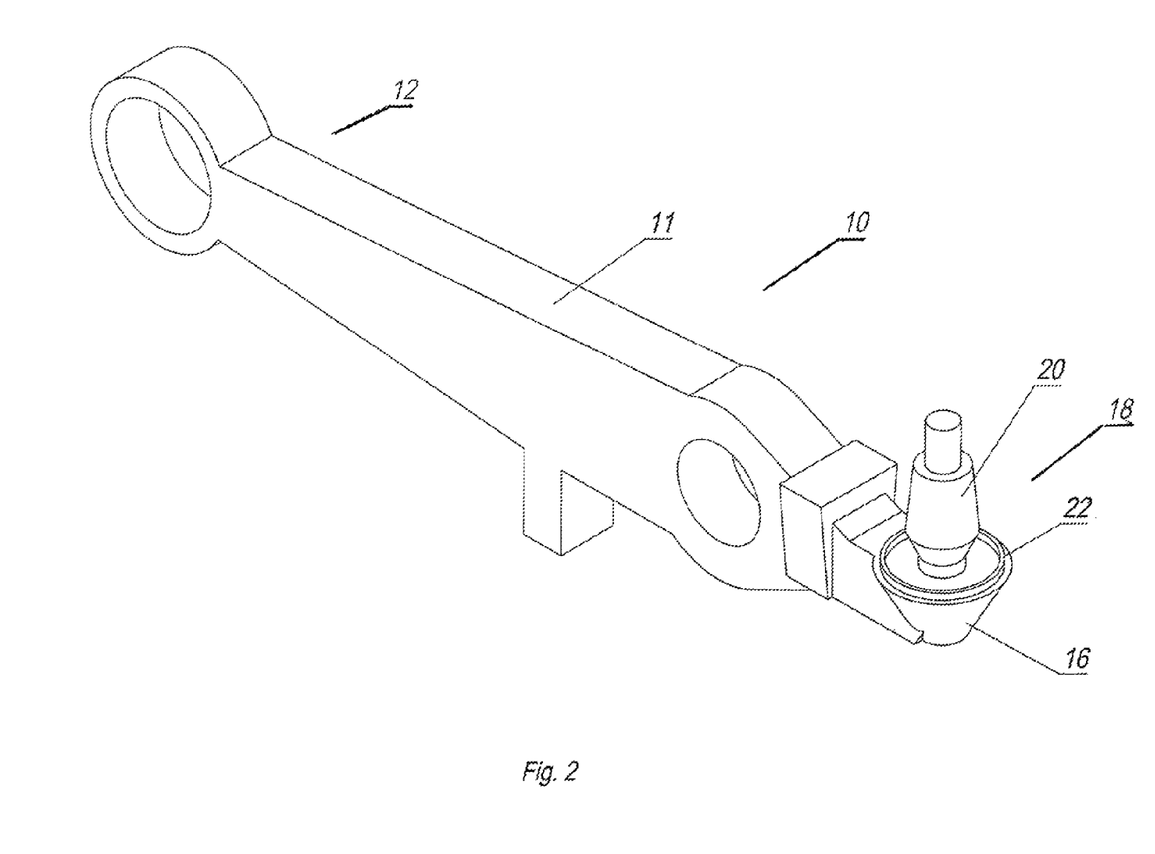
FIG. 2 illustrates an example repaired control arm of the automotive suspension.

Next with reference to FIG. 2, a new circular, upward-extending aluminum flange 22 can be formed on the edge of the receptacle 16 of the control arm 10 using, for example, welding. For example, Phoenix 500 welding apparatus can be used for welding new aluminum flange 22 on the receptacle 16. In a preferred embodiment, the welding should be performed in a neutral environment using pulse welding, which facilitates the destruction of an acid film forming on the surface of the aluminum receptacle 16 being welded. An aluminum rod can be used to form a new circular flange 22 on the surface of receptacle 16. Once a new aluminum flange 22 is formed on the surface of the receptacle 16, a new bearing stud 20 can be inserted in the receptacle 16 along with a new washer (not shown) and/or grease lubricant (not shown). And an optional cover having an opening in the center thereof or a pressing ring (not shown) can be inserted to close the opening in the receptacle 16. Next, the new circular flange 22 can be bent (or swaged) inwards to partially seal gaff the cover covering the new bearing stud 20 within its position in the receptacle 16. In this manner, the used control arm 10 is repaired.

Figure 3:
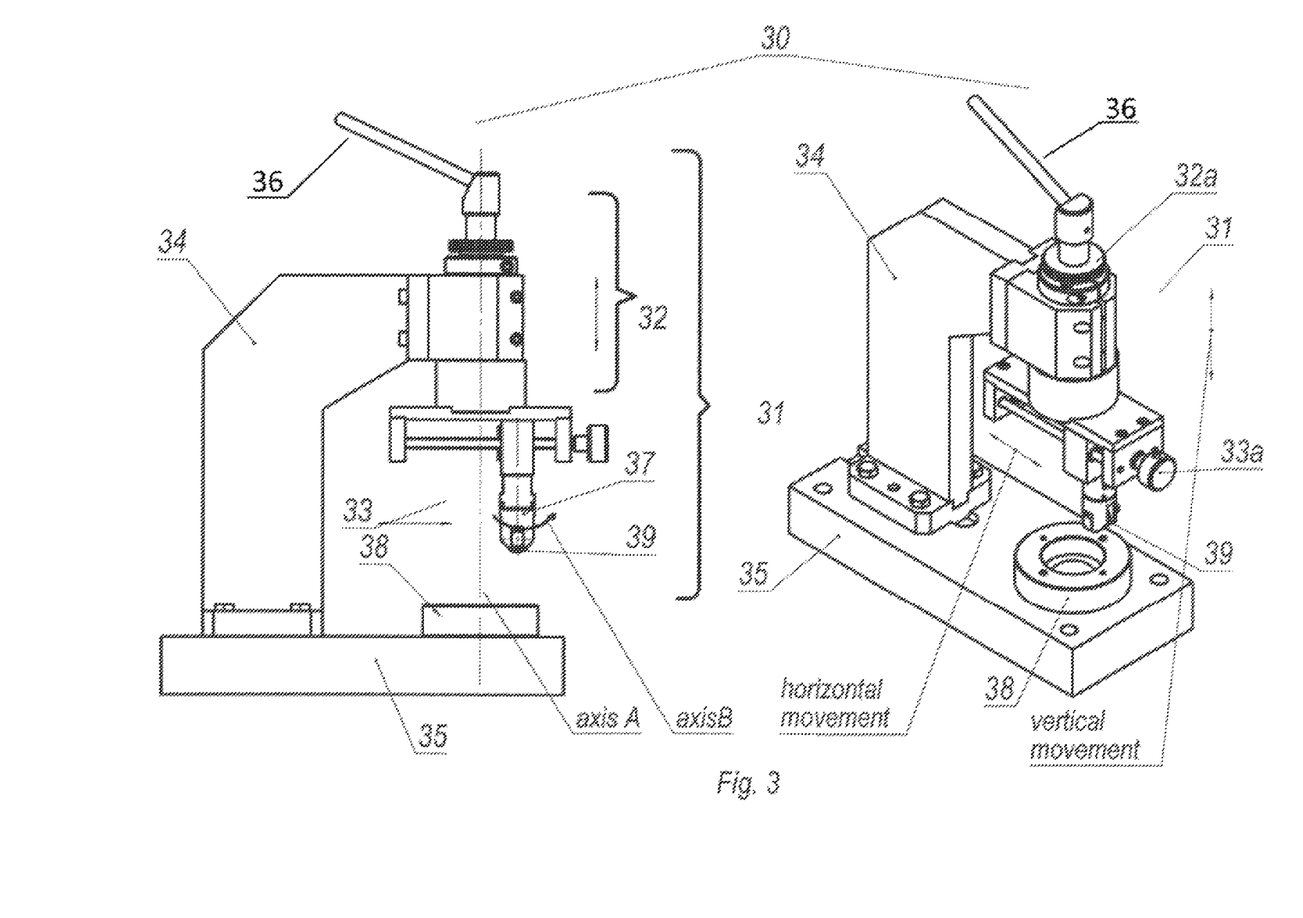
FIG. 3 illustrates side and elevated views of one example embodiment of the apparatus for repairing the control arm of the automotive suspension.
Figure 4:
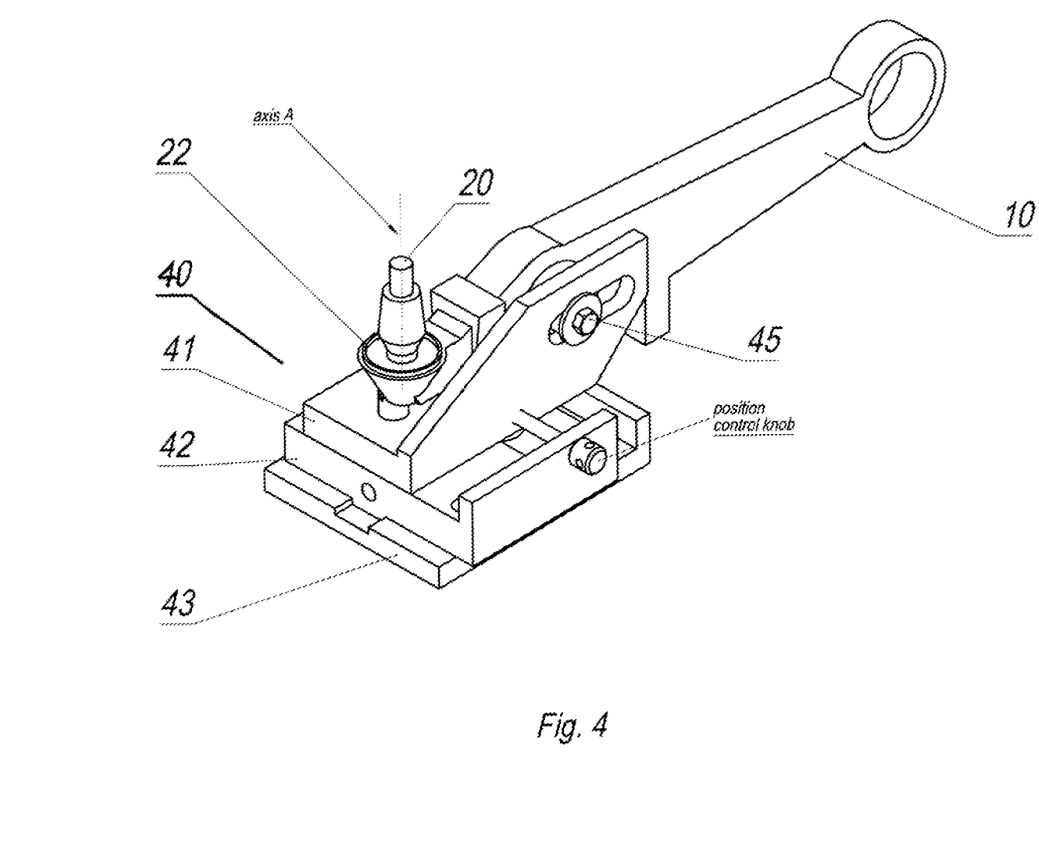
FIG. 4-9 illustrates various example embodiments of the configuration of the apparatus for repairing the control arm of the automotive suspension.
Figure 5:
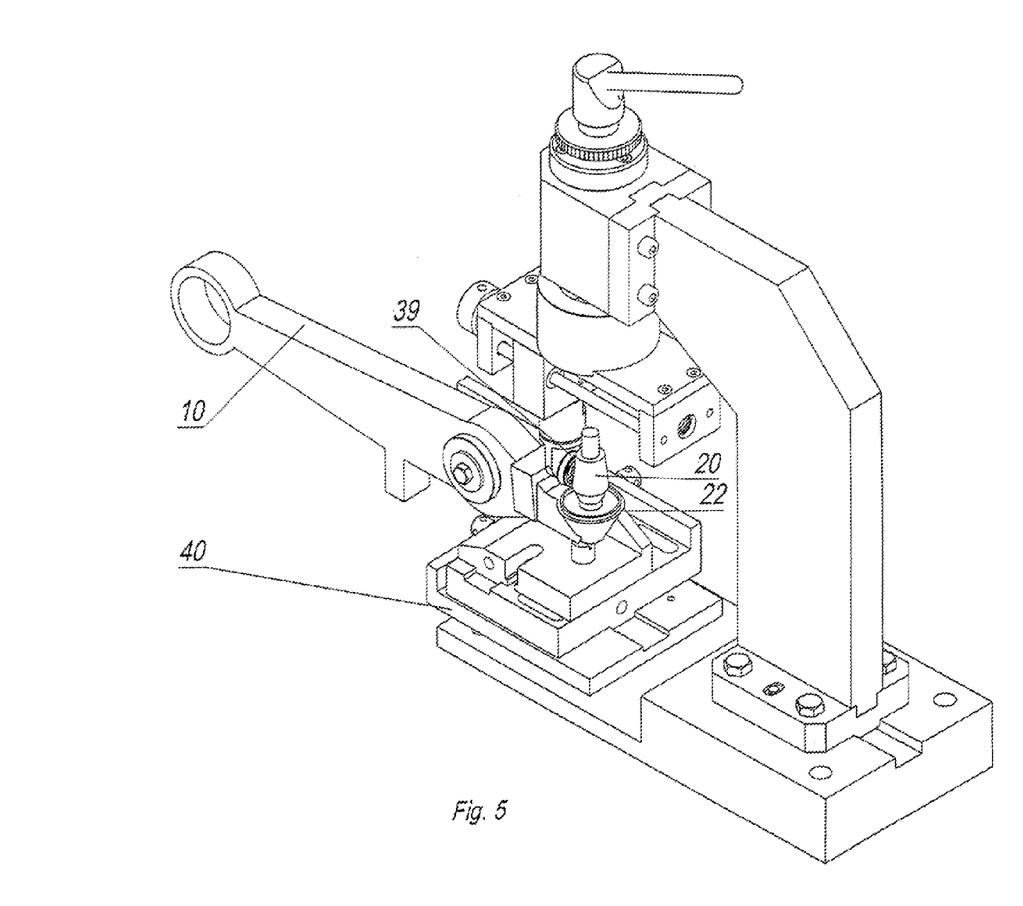
Figure 6:
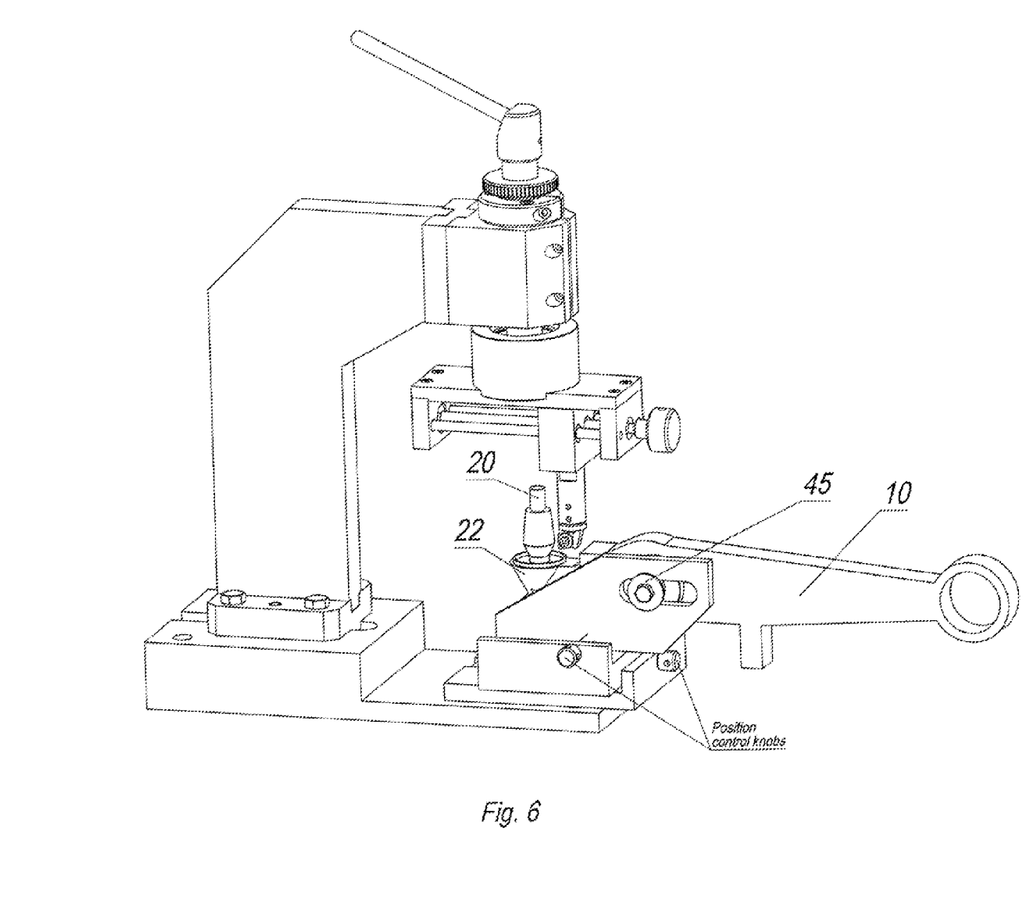
Figure 7:
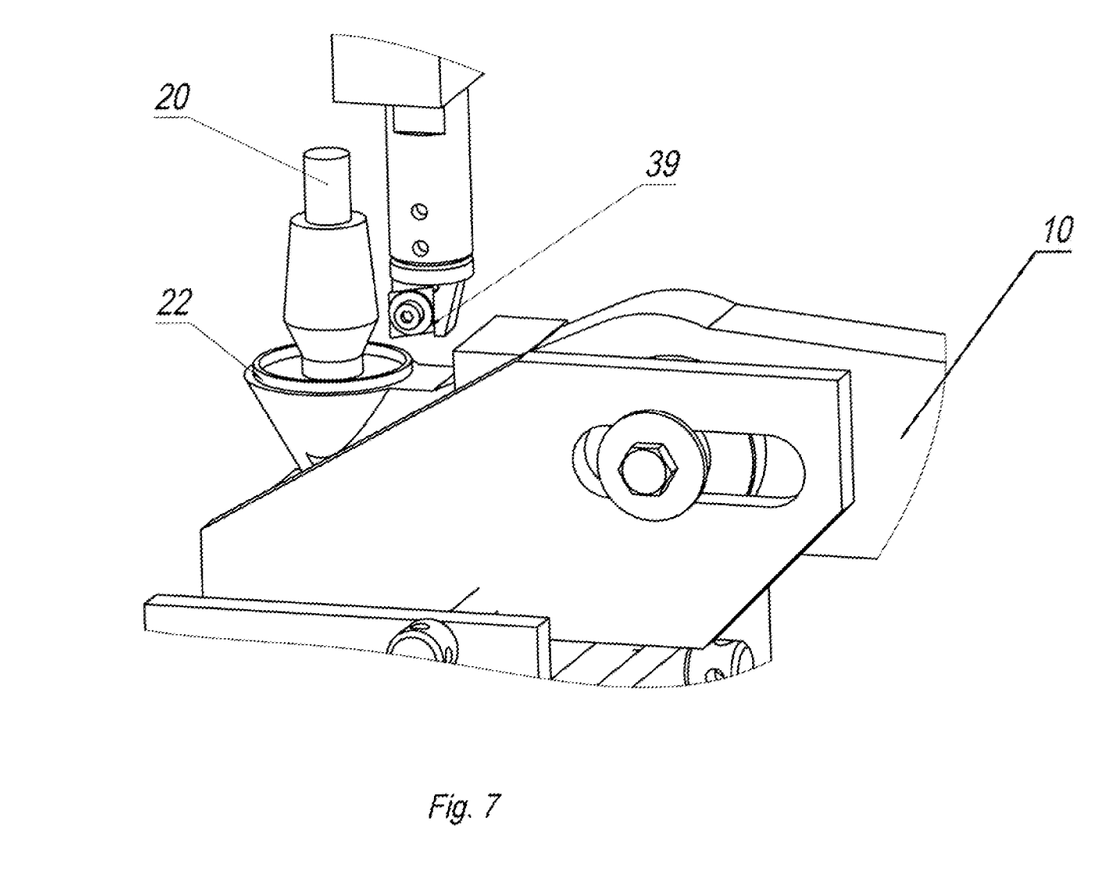
Figure 8:
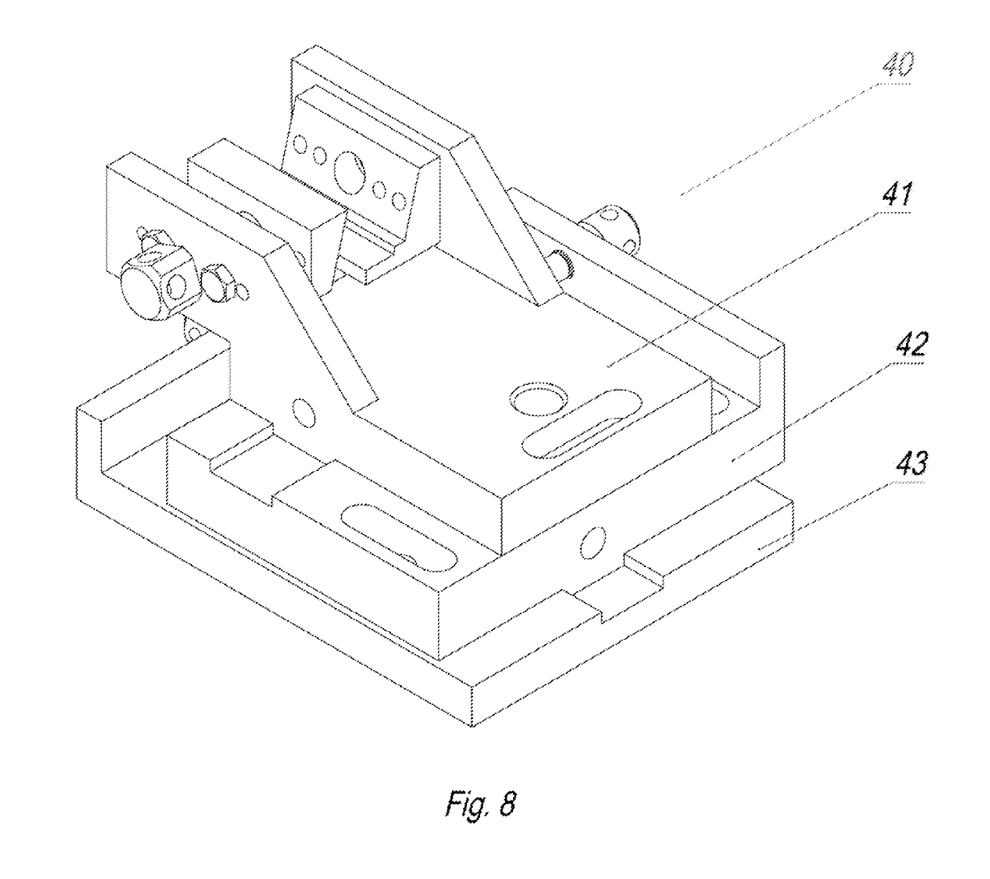
Figure 9:
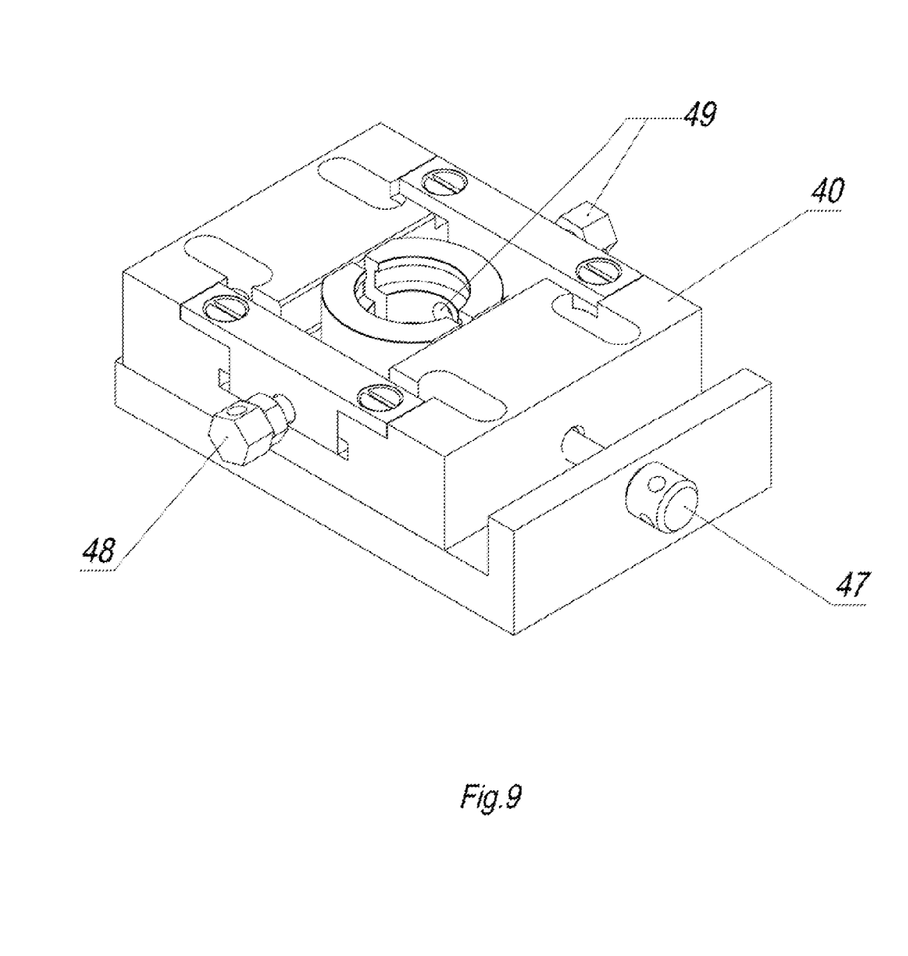

FIG. 3 depicts one example embodiment of a bending roller apparatus that can be used for repairing various types and brands of control arms of different automotive suspensions. Particularly, the bending roller apparatus 30 can be manually or automatically controlled to perform bending (or swaging) of a newly formed aluminum flange 22 of the repaired control arm 10. As depicted, the apparatus 30 includes a roller mechanism 31, roller support 34, and a base 35. The roller mechanism 31 includes a vertical positioning mechanism 32, a horizontal positioning mechanism 33, and a bending roller assembly 37. The vertical positioning mechanism 32 is used for adjusting the elevation of the bending roller 37 along axis A and relative to a saddle 38 of the base 35. The vertical positioning mechanism 32 can be implemented as a simple mechanical linear actuator (e.g., a screw or leadscrew), which transfers rotation of level 36 into linear (up or down) movement of roller assembly 37. The horizontal positioning mechanism 33 is used for adjusting the longitudinal position of the bending roller 37 relative to the axis A and relative to the saddle 38 of the base 35. The vertical positioning mechanism 32 can be implemented in a similar manner as a simple mechanical linear actuator (e.g., a screw or leadscrew), which transfers rotation of knob 33a into linear (horizontal) movement of roller assembly 37. The saddle 38 is used to rotatably support a matrix to which a control arm 10 is removably affixed. The matrix will be discussed next.

In one example embodiment, different matrices can be used for different types or configurations of control arms of different automotive suspensions. The selection of the appropriate matrix can be performed by the human operator or automatically by a computer. One example configuration of the matrix is shown in FIGS. 4-9. Matrix 40 is used for holding and positioning the control arm 10 during bending (swaging) of the newly formed circular aluminum flange 22 of the receptacle 16. As shown, matrix 40 comprises three plates 41, 42 and 43 slidably connected to each other and rotatably connected to the saddle 38 of the of the base 35 to provide three-degrees of freedom (e.g., longitudinal, lateral and rotational) of movement of the control arm 10 in a horizontal plane relative to the base 35 of the bending apparatus 30. The control arm 10 may be removably affixed to the top plate 41 via control bolt 45. Generally, the position of the matrix 40 can be calibrated using matrix positioning mechanisms 47, 48 and 49 in such a manner that the bearing stud 20 of the control arm 10 affixed to the matrix 40 is centered along the axis A of the roller mechanism 31. The matrix positioning mechanisms can be implemented as simple mechanical linear actuator (e.g., a screw or leadscrew), which transfers rotation of control knobs into linear movement or rotation of plates 41, 42 and 43 in a horizontal plane relative to each other and the base 35 of bending roller apparatus 30.

Once the matrix 40 is centered in the required position, the position of the roller mechanism 31 may be calibrated (i.e., adjusted) using vertical positioning mechanism 32 (e.g., using vertical position control screw-nut 32a) and horizontal positioning mechanism 33 (e.g., using horizontal position control knob 33a) to bring roller 39 of the bending roller assembly 37 into contact with the outer surface of the new aluminum flange 22 of the control arm 10.

The rotator level 36 may then be manually or automatically rotated to rotate the roller mechanism 1 around axis A and, through the operation of the mechanical linear actuator disposed within the vertical positioning mechanism 32 press the roller assembly 37 downwards. The surface of the roller 39 may be slanted. The bending assembly 37 is operable to rotate around the axis B. Thus, when the roller mechanism 31 is rotated around axis A, the roller assembly 37 rotates around the axis B as the roller 39 roles along the circumference of the aluminum flange 22, and applies downward and inward force to the outer surface of the flange 22, thereby bending it inwards, i.e., toward the center of the opening of the receptacle 16, and thus sealing off the cover or the ring of the receptacle, which hold the bearing stud 20 in its place. The repaired control arm 10 then be removed from the bending roller apparatus 30 and apparatus can be recalibrated to repair another control arm.

Figure 10:
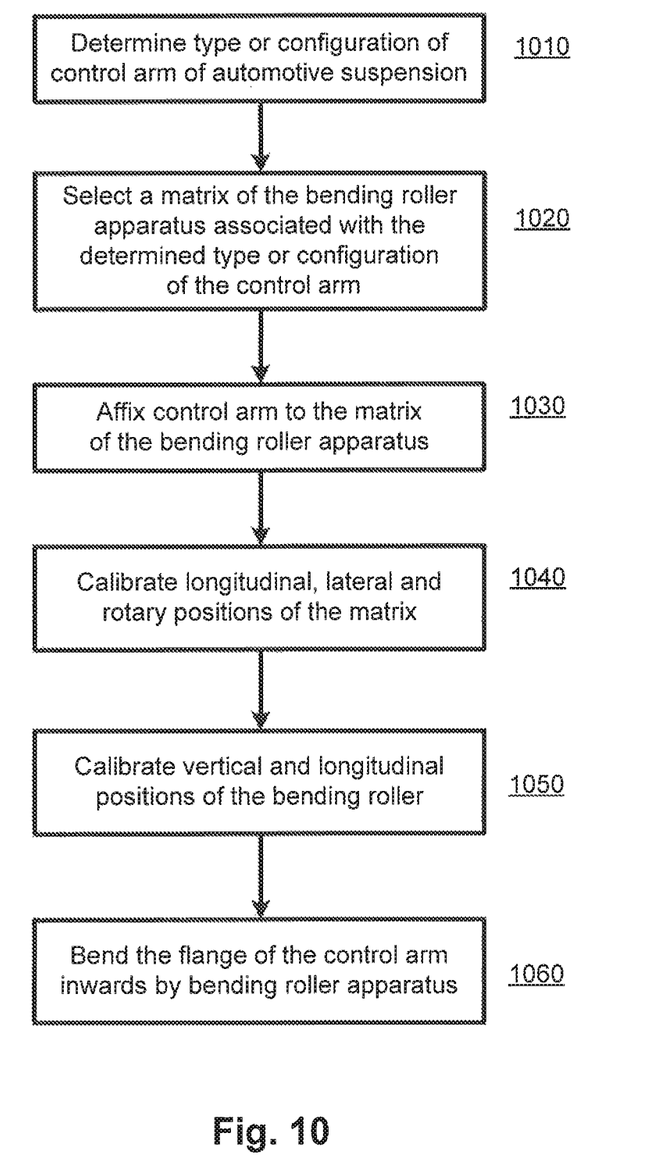
FIG. 10 illustrates a flow chart of example methodology for repairing a control arm of the automotive suspension.

FIG. 10 depicts one example methodology for repairing aluminum control arms of an automotive suspension using the bending roller apparatus 30. At step 1010, the type and/or configuration of the used control arm of automotive suspension is determined. The determination may be based on the manufacturer's part number. At step 1020, an appropriate matrix of the bending roller apparatus associated with the determined type or configuration of the control arm is selected. The selection of the appropriate matrix can be performed by the human operator or autocratically by a computer. At step 1030, the control arm is affixed to the selected matrix of the bending roller apparatus, and the matrix (with control arm affixed thereto) is set into the saddle of be bending roller apparatus. At step 1040, the longitudinal, lateral and rotary positions of the matrix are calibrated. At step 1050, the vertical and longitudinal positions of the bending roller are calibrated to bring the bending roller in contact with the new flange of the control arm. At step 1060, the bending roller is roiled along the circumference of the flange while applying a downward force on the flange thereby bending (or swaging) the flange inwards and sealing off the ball end of the ball stud in the receptacle of the control arm. The repaired control arm may then be removed from the matrix.

In one example embodiment, the above-described calibration processes may be automated and performed by a computer. In particular, bending roller positioning mechanisms 32a, 33a and 36, and/or matrix calibrating mechanisms 47, 48 and 49 can be replace with, or connected to electro-mechanical actuators, which may be controlled by a computer. Particularly, the computer may contain a program that accepts as an input manufacturer's part number or other identifier of the control arm 10. The computer stores in its memory a table containing dimensions or other information for different types of control arms of different manufacturers. Based on this information, the computer can generate and send electric signals to the bending roller positioning mechanisms and/or matrix calibrating mechanisms for calibrating longitudinal, lateral and rotary positions of the bending roller 37 and matrix 40, with control arm attached thereto, to bring the bending roller 37 in contact with the flange 20 of the control arm 10. The computer may then activate level 36 to perform bending (or swaging) of the flange 20, thereby automatically repairing the control arm 10.

The above described apparatus and methods for repairing control arms automotive suspensions have numerous advantages. For example, the method is relatively inexpensive and easy to implement to provide refurbished control arms for the automotive aftermarket. A single bending roller apparatus can be used to repair aluminum control arms of different types of configurations due to use of different matrices. Another advantage of the disclosed technology is that it can be implemented in a factory environment and automated using computer systems for mass repair of control arms for different automotive suspensions.

Figure 11:
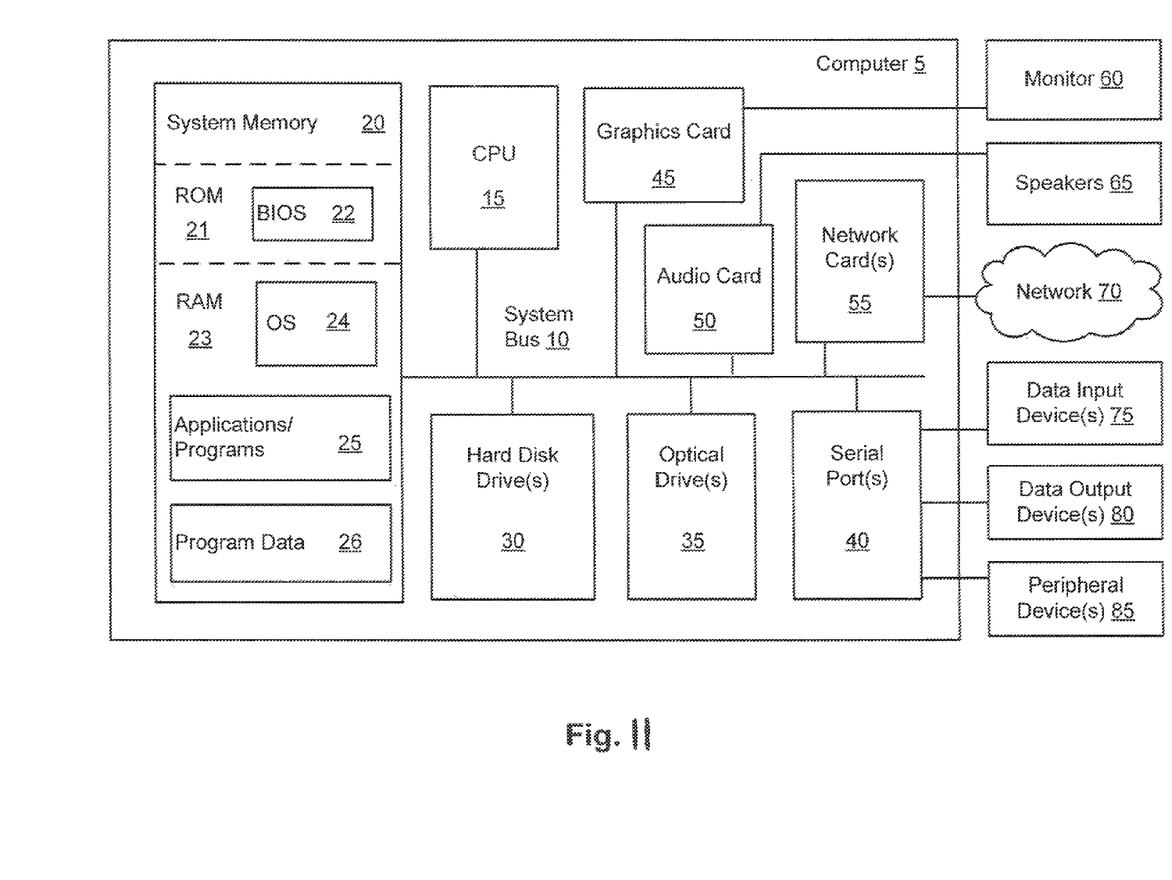
FIG. 11 illustrates a block diagram of a computer system for controlling operation of the apparatus for repairing control arm according to one example embodiment.

FIG. 11 depicts one example embodiment of a computer system 5, such as a general-purpose computer, which can be programmed to automatically control operation of the apparatus of the present invention for repairing control arms of automotive suspension. As shown, computer 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller a peripheral bus and a local bus using any of a variety of known bus architectures. Hardware processor 15 may include one or more Intel® Core 2 Quad 2.33 GHz processors other type of microprocessor.

System memory 20 may include a read-only memory (ROM) 21 and random access memory (RAM) 23, Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer 5, such as during start-u. RAM 23 stores operating system 24 (OS), such as Windows® XP Professional or other type of operating system, that is responsible for management and coordination of processes and allocation and sharing of hardware resources in computer 5. System memory 20 also stores applications and programs 25, such as a control program of the bending roller tool 30. System memory 20 also stores various runtime data 26 used by programs 25, such as matrix position adjustment parameters for different types and brands of control arms used on different types of automotive suspensions.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement processes and method's disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the processes and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that any more modifications than mentioned above are possible without departing from the inventive concepts disclosed herein.

The invention claimed is:

1. An apparatus for repairing a control arm of an automotive suspension, wherein the control arm includes a body having a receptacle at one end thereof, and a ball stud having a ball end inserted in the receptacle, the receptacle further including a substantially continuous circular, upward-extending flange welded at an edge of the receptacle, the apparatus comprising:
a base having a saddle, and a matrix rotatably supported by the saddle, wherein a control arm is removably affixable to the matrix, and wherein the matrix provides longitudinal and lateral movements and rotation of the control arm affixed thereto in a horizontal plane relative to the base of the apparatus;
the matrix comprising a matrix position calibration means arranged to calibrate longitudinal, lateral and rotary positions of the matrix in a horizontal plane relative to the base of the apparatus;
a bending roller attached to a bending roller positioning means, wherein the bending roller positioning means is arranged to calibrate vertical and longitudinal positions of the bending roller to bring the bending roller in contact with the upward-extending flange; and
a bending roller means arranged to bend the flange by rolling the bending roller along a circumference of the flange while applying a downward force on the flange thereby bending the flange and sealing off the ball end of the ball stud in the receptacle.

2. The apparatus of claim 1, wherein the matrix position calibration means and the bending roller positioning means comprises a plurality of electro-mechanical actuators for calibrating respective positions of the matrix and the bending roller means.

3. The apparatus of claim 2, comprising a computer, wherein the electro-mechanical actuators are connected to and controlled by the computer operable to execute an algorithm for calibrating the positions of the matrix and the bending roller means for different types of control arms.

4. The apparatus of claim 1, wherein the matrix position calibration means and the bending roller positioning means include a plurality of manual control means.

5. The apparatus of claim 1, wherein the matrix comprises at least three stacked plates slidably connected to each other and arranged to move in lateral and longitudinal directions relative to the base, wherein a bottom plate is rotatably connected to the saddle of the base, a middle plate is laterally slidable relative to the bottom plate, and a top plate is longitudinally slidable, to the middle plate, and wherein the top plate includes means for removably affixing different types of control arms of automotive suspensions.

6. The apparatus of claim 1, wherein the control arm, including the receptacle and the flange, are made of aluminum or aluminum alloy, and the ball stud is made of steel.

7. The apparatus of claim 1, comprising a plurality of different matrices, wherein each different matrix is used for a particular type and configuration of control arm of an automotive suspension.

* * * * *